(12) United States Patent
Zaniboni

(10) Patent No.: US 7,997,663 B2
(45) Date of Patent: Aug. 16, 2011

(54) OVERMASK ELEMENT FOR VEHICLE WHEELS

(75) Inventor: Giovanni Zaniboni, Pognano (IT)

(73) Assignee: Lupini Targhe S.p.A., Pognano, Bergamo (IT)

(*) Notice: Subject to any disclaimer, the term of this patent is extended or adjusted under 35 U.S.C. 154(b) by 0 days.

(21) Appl. No.: 12/368,375

(22) Filed: Feb. 10, 2009

(65) Prior Publication Data

US 2009/0179481 A1 Jul. 16, 2009

Related U.S. Application Data

(63) Continuation of application No. PCT/IT2006/000619, filed on Aug. 11, 2006.

(51) Int. Cl.
*B60B 7/14* (2006.01)

(52) U.S. Cl. ................... 301/37.373; 301/37.42

(58) Field of Classification Search .......... 301/37.101, 301/37.372, 37.373, 37.42, 108.1–108.4
See application file for complete search history.

(56) References Cited

U.S. PATENT DOCUMENTS

| | | | |
|---|---|---|---|
| 2,368,228 A | 1/1945 | Lyon | |
| 3,092,421 A * | 6/1963 | Lyon | 301/37.372 |
| 4,123,111 A * | 10/1978 | Renz et al. | 301/37.35 |
| 4,707,035 A | 11/1987 | Kondo et al. | |
| 4,842,339 A | 6/1989 | Roulinson | |
| 4,962,968 A | 10/1990 | Caplin | |
| 5,071,197 A * | 12/1991 | Webster et al. | 301/37.372 |
| 6,325,461 B1 | 12/2001 | Hauler | |
| 6,682,151 B1 | 1/2004 | Van Houten et al. | |
| 7,108,334 B2 * | 9/2006 | Bruce | 301/37.373 |
| 7,300,117 B2 * | 11/2007 | Bruce et al. | 301/37.31 |
| 2005/0073192 A1 | 4/2005 | Bruce et al. | |
| 2005/0212349 A1 * | 9/2005 | Bruce et al. | 301/37.373 |

OTHER PUBLICATIONS

International Search Report for corresponding International Patent Application No. PCT/IT2006/000619 dated Mar. 26, 2007 (3 pages).
International Preliminary Report on Patentability for corresponding International Patent Application No. PCT/IT2006/000619 dated Nov. 18, 2008 (9 pages).

* cited by examiner

*Primary Examiner* — Jason R Bellinger
(74) *Attorney, Agent, or Firm* — Kilyk & Bowersox, P.L.L.C.

(57) ABSTRACT

A wheel cover suitable for being mounted on vehicle wheels having an outer surface adapted for facing away from a wheel of a vehicle and an inner surface adapted for facing towards the wheel when mounting the wheel cover. Central fasteners and peripheral fasteners extend from the inner surface towards the wheel of the vehicle. The central fasteners are arranged at bolts of the wheel. Both the central fasteners and the peripheral fasteners are shaped so as to make an exclusively snap-type mounting of the wheel cover on elements of the wheel. A ridge projects from the inner surface of the wheel cover to make abutment with the head of the bolt at the same time the rib or tooth abuts onto the sloped section of the bolt head to stop the insertion movement.

9 Claims, 4 Drawing Sheets

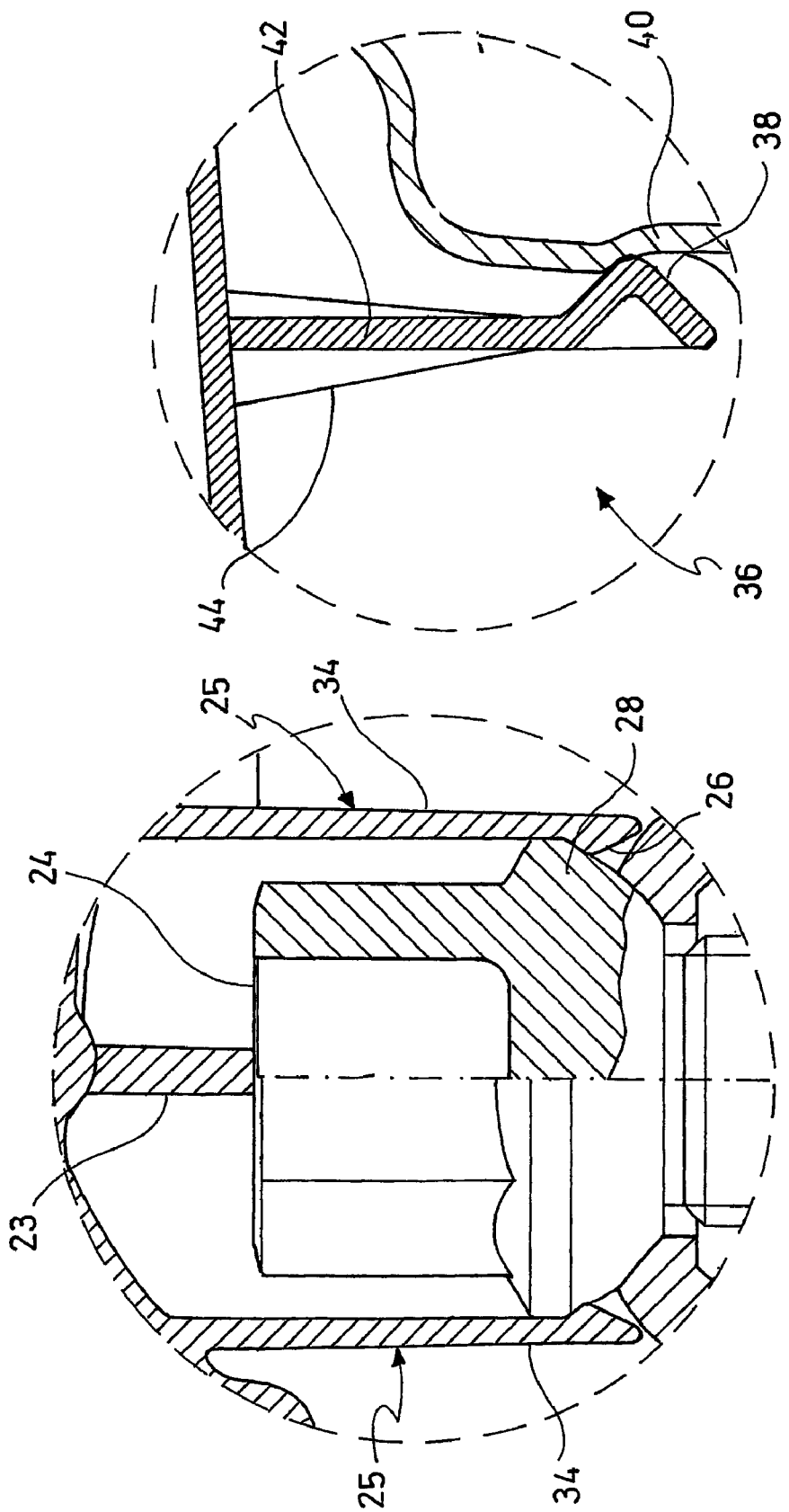

OVERMASK ELEMENT FOR VEHICLE WHEELS

This application is a continuation of International Application No. PCT/IT2006/000619, filed Aug. 11, 2006.

BACKGROUND OF THE INVENTION

1. Field of the Invention

The present invention relates to a wheel cover for vehicle wheels.

2. Description of the Prior Art

In the automotive field, wheel covers suitable for being mounted on the rims of a vehicle's wheels are known, mainly in order to improve wheel appearance. Two distinct mounting devices are currently known for carrying out such an operation.

A first mounting device has a plurality of central fasteners that extend from inside the wheel cover and lock onto the wheel bolts. Such a mounting device allows mounting of the wheel cover onto the wheel to be simplified and sped up, but does not ensure an effective seal, and, in particular, it has the major drawback of leaving the edge of the wheel cover free such that it can thus move and create a so-called "gaping effect".

A second mounting device has a plurality of peripheral fasteners that extend from inside the wheel cover and lock onto a portion of the wheel through the use of an elastic locking element or spring. The presence of the spring, whilst allowing high resistance and therefore quite an effective seal above all at the edge of the wheel cover, creates a harmful unbalancing effect due to its eccentricity. In other words, after a wheel has been mounted onto the respective hub during the assembly of an automobile, the balancing of the same wheel is carried out. Then, the wheel cover is mounted to complete the wheel. At this point, however, the wheel is no longer balanced due to the presence of the spring that has a substantial influence upon eccentricity with respect to the same wheel.

Moreover, the weight of the wheel cover is rather high.

From the above, it can thus be seen that particularly important requirements in the application of wheel covers are simplicity of mounting, effectiveness of mounting and limiting weight of the wheel cover.

SUMMARY OF THE INVENTION

An object of the present invention is therefore to provide a wheel cover that has structural and functional characteristics which can satisfy the aforementioned requirements and, at the same time, avoid the indicated problem and drawbacks of the prior art.

Such a problem is solved through a wheel cover suitable for being mounted on vehicle wheels comprising an outer surface suitable for facing away from a wheel of the vehicle and an inner surface adapted for facing towards the wheel of the vehicle.

Central fastening means and peripheral fastening means extend from the inner surface towards the wheel of the vehicle. The central fastening means are arranged along a first circumference of the wheel cover at bolts of the wheel and the peripheral fastening means are arranged along a second circumference having a greater diameter than the first circumference.

The central fastening means comprise a plurality of elastic fasteners suitable for snapping onto the head of the bolts.

The elastic fastener comprises a tab suitable for enveloping the head of the respective bolt.

The wheel cover also comprises a stop element to stop the insertion movement of the wheel cover when mounted on a wheel.

The stop element comprises a ridge projecting from the inner surface of the wheel cover.

BRIEF DESCRIPTION OF THE DRAWINGS

FIG. 4 illustrates the enlarged detail IV of FIG. 3;

FIG. 5 illustrates the enlarged detail V of FIG. 3.

DESCRIPTION OF THE PREFERRED EMBODIMENTS

Figure 1:
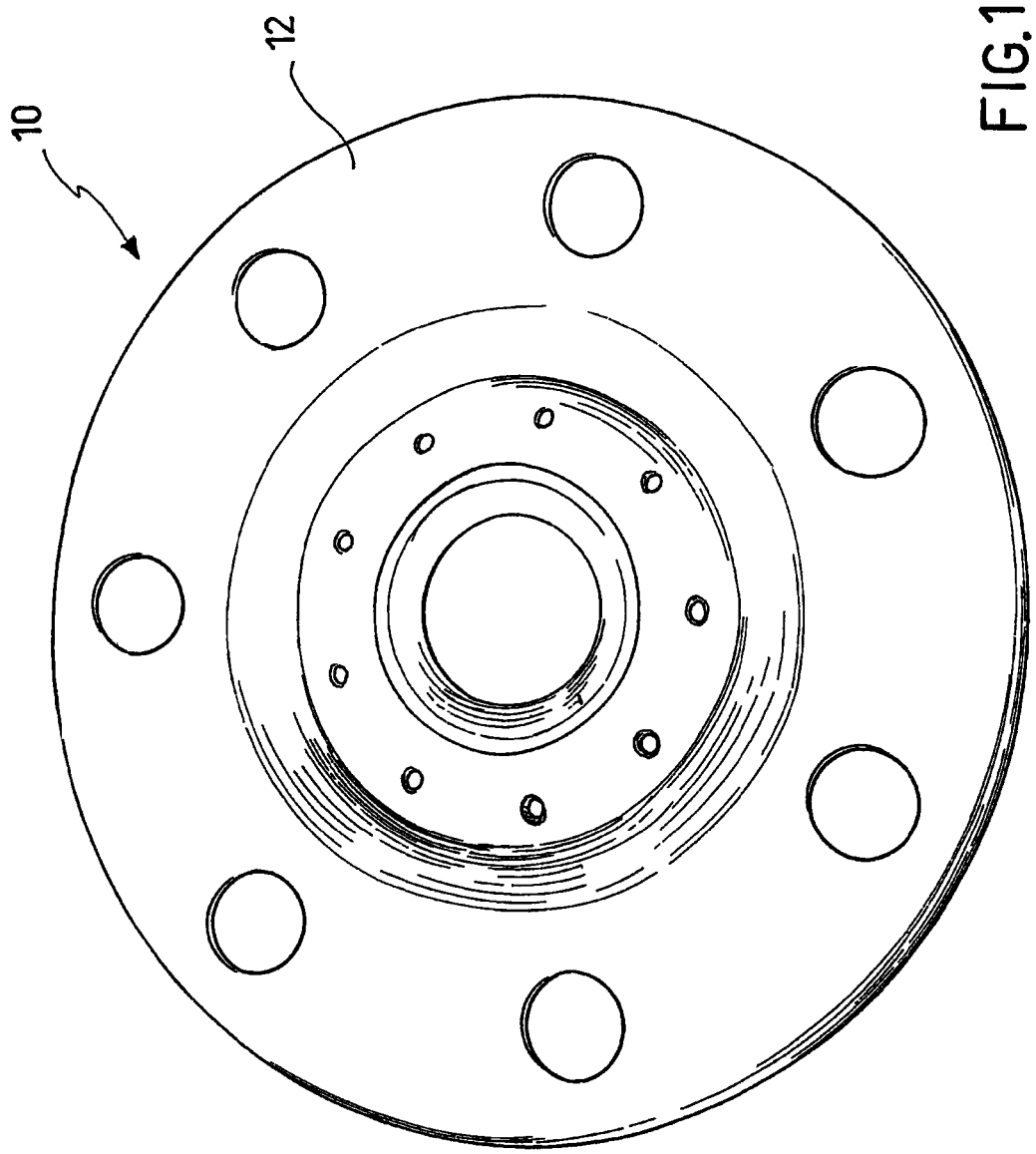
FIG. 1 illustrates a front perspective view of a wheel cover according to the present invention.
Figure 2:
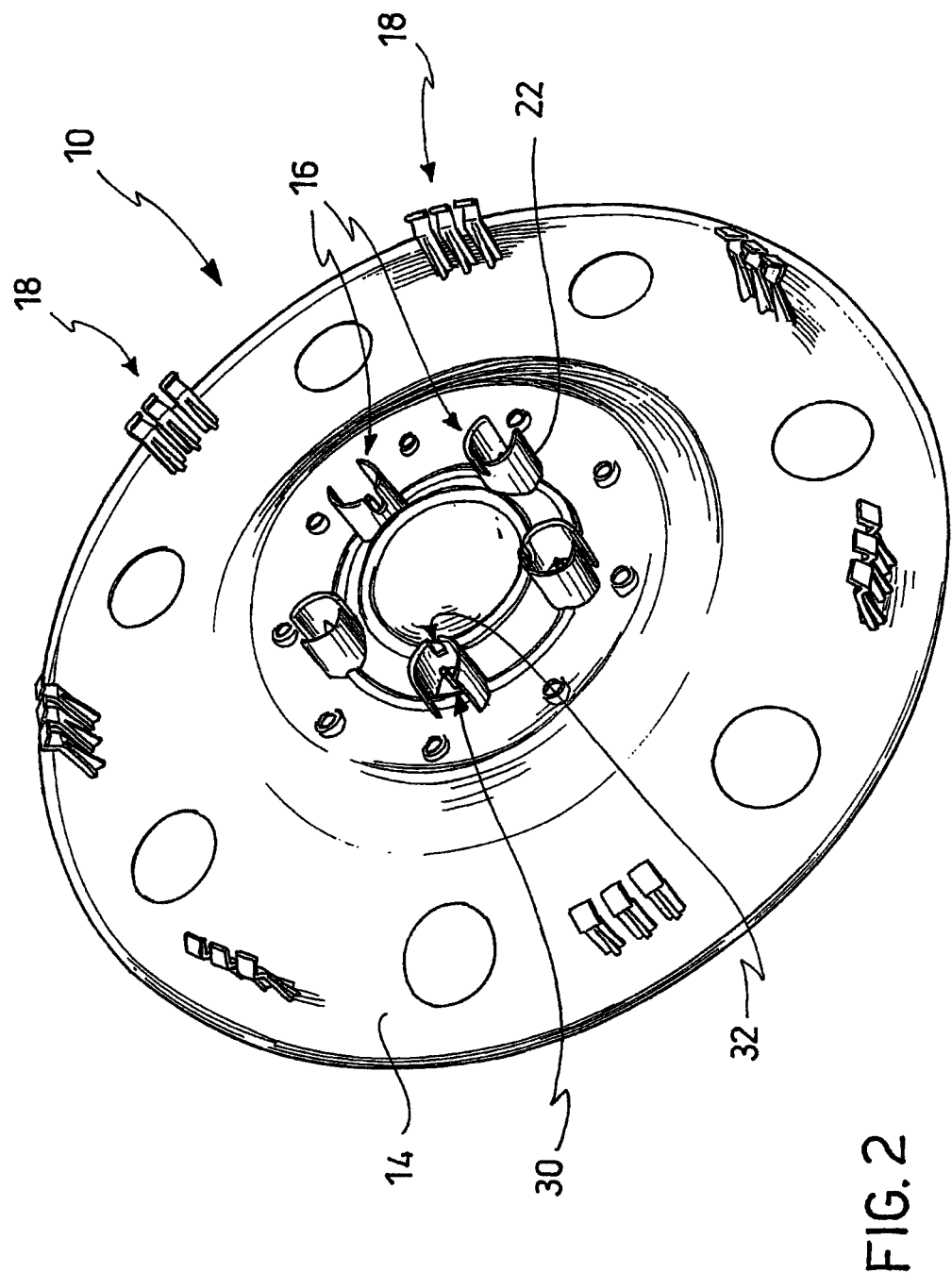
FIG. 2 illustrates a rear perspective view of the wheel cover of FIG. 1.
Figure 3:
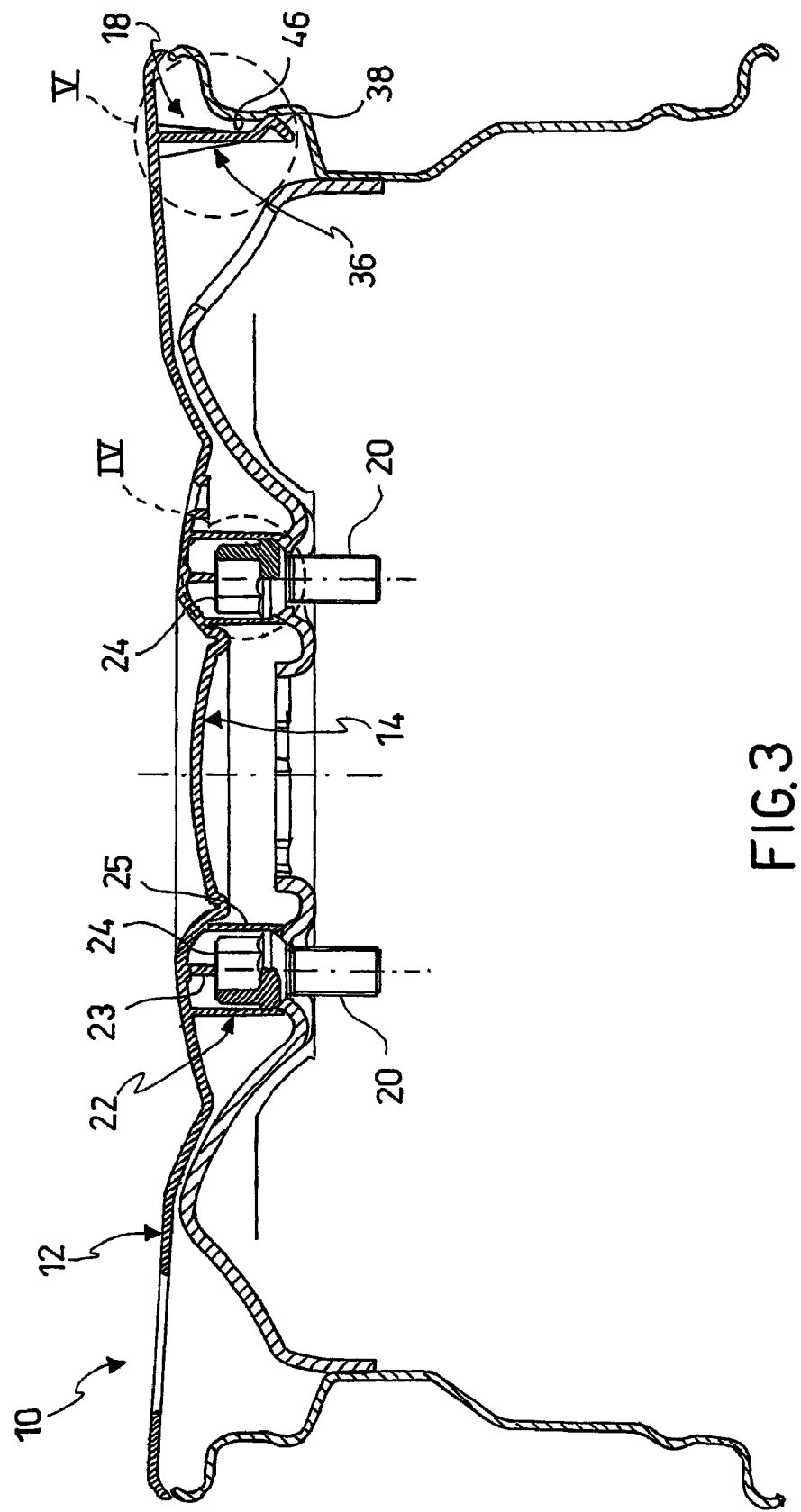
FIG. 3 illustrates a sectional section view of a wheel cover according to the present invention mounted on a vehicle's wheel.

With reference to the aforementioned figures, reference numeral 10 indicates a wheel cover, an outer surface 12 of which is adapted for facing away from a wheel of a vehicle and an inner surface 14 adapted for facing towards the wheel of the vehicle.

Advantageously, central fastening means 16 and peripheral fastening means 18 extend from the inner surface 14 towards the wheel of the vehicle. The central fastening means 16 are arranged along a first circumference of the wheel cover at bolts 20; the peripheral fastening means 18 are arranged along a second circumference having a greater diameter than the first circumference, preferably arranged at the peripheral edge of the wheel cover.

Both the central fastening means 16 and the peripheral fastening means 18 are shaped so as to make an exclusively snap-type mounting of the wheel cover onto elements of the wheel.

The central fastening means comprise a plurality of elastic fasteners 22 suitable for snap-inserting onto the head 24 of the bolts 20. In particular, an elastic fastener 22 comprises a tab 25 suitable for enveloping the head of the respective bolt. An end of the tab is advantageously provided with a rib or tooth 26 suitable for abutting on a sloped section 28 of the head of the respective bolt, according to the direction of insertion of the fastener parallel to the axis of the bolt itself.

In the example illustrated in the figures, the tab 25 is defined by a circular wall that has a longitudinal opening 30. A longitudinal notch 32 can also be used, preferably diametrically opposite the longitudinal opening 30, so as to form two elastic portions 34 of the tab 25.

In accordance with an embodiment, the same number of elastic fasteners 22 can be used as there are bolts of the wheel. Alternatively, a different number can be used, for example, less than the number of bolts of the wheel.

Moreover, the circular wall of the tab 25 defines a portion of the inner surface 14 of the wheel cover from which a ridge 23 projects. This ridge 23 acts as a stop element when the wheel cover is mounted on the wheel, as shall be described hereafter.

The peripheral fastening means 18 comprise a plurality of peripheral elastic tabs 36 arranged along a second circumference having a greater diameter than the first circumference.

Preferably, the peripheral elastic tabs are arranged along a circumference arranged at the peripheral edge of the wheel cover.

The peripheral elastic tabs are arranged, for example, in groups of a few tabs uniformly distributed along the second circumference. In the example illustrated in the figures, the peripheral elastic tabs are grouped in groups of three tabs and such groups are distributed along the second circumference. In different embodiments, the groups of peripheral elastic tabs can comprise a different number of tabs or else the peripheral elastic tabs can be uniformly distributed along the second circumference.

In accordance with an embodiment, a peripheral elastic tab can comprise a rib or tooth 38 suitable for abutting snapping into place into a circumferential recess 40 of the wheel, according to the direction of insertion of the wheel cover on the same wheel.

Preferably, a peripheral elastic tab 36 consists of a shaped wall 42 that extends from the inner surface of the wheel cover and that defines the aforementioned rib or tooth 38. Advantageously, the shaped wall 42 is flat, and a stiffening rib 44 can be arranged transversally with respect to the plane of extension of such a shaped wall.

Hereafter, the mounting of the wheel cover as described earlier is further described.

The wheel cover is brought up to the wheel according to a direction parallel to the axis of the bolts and to the rotation axis of the wheel itself.

The elastic fasteners 22 open out onto the head of the respective bolt until the rib or tooth 26 abuts on the sloped section 28 of the head of the respective bolt, according to the direction of insertion of the fastener parallel to the axis of the bolt itself.

At the same time, the ridge 23 makes an abutment against the head 24 of the bolt 20, thus stopping the insertion movement of the wheel cover to advantageously avoid a movement that is too forceful so as to be able to cause the elastic fasteners 22 to be squashed and accidentally breaking.

The peripheral elastic tabs 36 slide along a side wall 46 of the wheel deforming towards the inside of the wheel itself until the rib or tooth 38 snaps into the circumferential recess 40 of the wheel, according to the direction of insertion of the wheel cover onto the wheel itself.

To dismount the wheel cover, one has to pull the wheel cover itself outwards, parallel to the rotation axis of the wheel so that the elastic fasteners 22 and the peripheral elastic tabs 36 respectively disengage from the head of the bolts and from the circumferential recess.

From the above, it can be appreciated how a wheel cover according to the present invention allows the aforementioned requirement of obtaining simple but effective mounting to be satisfied, providing a wheel cover having a limited weight.

The advantageous combination of elastic fasteners suitable for locking on the bolts of the wheel and of peripheral elastic tabs suitable for snap-locking onto the wheel itself allows gaping effects to be avoided by locking the peripheral edge of the wheel cover. The simultaneous synergic provision of both of the aforementioned locking methods allows the use of the so-called spring to be avoided and allows the undesired unbalancing effect to be avoided, at the same time reducing the weight of the wheel cover. Indeed, the mounting is ensured both in central position and in peripheral position without burdening the structure with elements like springs or other elements.

For example, the elastic fasteners can be made from two or more tabs arranged so as to envelop the respective bolt.

As an alternative to what has been illustrated, the peripheral elastic tabs can be suitable for deforming at a circumferential rib of the wheel, for example, suitable for being housed in a recess of the tab itself.

What is claimed is:

1. A wheel cover adapted to be mounted on vehicle wheel comprising:
   an outer surface adapted for facing away from a wheel of a vehicle, and an inner surface adapted for facing towards the wheel of the vehicle,
   central fastening means and peripheral fastening means extending from the inner surface of the wheel cover towards the wheel of the vehicle, wherein the central fastening means being arranged along a first circumference of the wheel cover where bolts of the wheel are arranged and the peripheral fastening means being arranged along a second circumference of the wheel cover having a greater diameter than the first circumference, wherein the central fastening means are shaped so as to make an exclusively snap-type mounting of the wheel cover on elements of the wheel, and wherein the central fastening means comprising a plurality of elastic fasteners adapted for snapping onto the head of the bolts, and wherein the elastic fasteners comprising a tab adapted for enveloping the head of the respective bolt and having an elastic circular wall portion radially spaced from the head of the bolt, wherein an end of the tab comprises a rib or tooth adapted for abutting onto a sloped section of the head of the respective bolt, wherein the sloped section is sloped relative to a direction of insertion of the elastic fastener onto the head of the bolt, wherein the direction of insertion extends parallel to an axis of the bolt,
   a ridge projecting from the inner surface of the wheel cover to make an abutment with the head of the bolt at the same time the rib or tooth abuts onto the sloped section of the head of the respective bolt, to stop the insertion movement of the wheel cover when mounted on the wheel, wherein the ridge comprises a single centrally-located ridge for making abutment with the bolt head, wherein the single centrally-located ridge extends co-axial to the axis of the bolt.

2. The wheel cover according to claim 1, in which the peripheral fastening means are shaped so as to make an exclusively snap-type mounting of the wheel cover onto elements of the wheel.

3. The wheel cover according to claim 1, in which the tab is defined by a circular wall that has a longitudinal opening.

4. The wheel cover according to claim 3, wherein the tab further comprises a longitudinal notch, diametrically opposite the longitudinal opening, to form two elastic portions of the tab.

5. The wheel cover according to claim 1, in which the peripheral fastening means comprise a plurality of peripheral elastic tabs arranged along the second circumference.

6. The wheel cover according to claim 5, in which the peripheral elastic tabs are arranged in groups of tabs distributed along the second circumference.

7. The wheel cover according to claim 5, in which a peripheral elastic tab comprises a shaped wall comprising an axially extending portion and a rib or tooth, wherein said axially extending portion extends from the inner surface of the wheel cover to the rib or tooth, wherein the rib or tooth is suitable for snapping into a circumferential recess of the wheel.

8. The wheel cover according to claim 7, further comprising a stiffening rib arranged transversally with respect to a plane of extension of the axially extending portion of the shaped wall.

9. A fastening arrangement for a wheel cover comprising a wheel cover comprising an outer surface facing away from a wheel of a vehicle, an inner surface facing towards the wheel of the vehicle, central fastening means and peripheral fastening means extending from the inner surface of the wheel cover towards the wheel of the vehicle, wherein the central fastening means being arranged along a first circumference of the wheel cover at bolts of the wheel and the peripheral fastening means being arranged along a second circumference of the wheel cover having a greater diameter than the first circumference, wherein the central fastening means are shaped so as to make an exclusively snap-type mounting of the wheel cover on elements of the wheel, and wherein the central fastening means comprising a plurality of elastic fasteners for snapping onto the head of the bolts, wherein the elastic fasteners comprising a tab enveloping the head of the respective bolt and having an elastic circular wall portion radially spaced from the head of the bolt, wherein an end of the tab comprises a rib or tooth abutting onto a sloped section of the head of the respective bolt, wherein the sloped section is sloped relative to a direction of insertion of the elastic fastener onto the head of the bolt, wherein the direction of insertion extends parallel to an axis of the bolt, and a ridge projecting from the inner surface of the wheel cover making an abutment with the head of the bolt at the same time the rib or tooth abuts onto the sloped section of the head of the respective bolt, to stop the insertion movement of the wheel cover when mounted on the wheel, wherein the ridge comprises a single centrally-located ridge for making abutment with the bolt head, wherein the single centrally-located ridge extends co-axial to the axis of the bolt.

* * * * *